Patented July 14, 1953

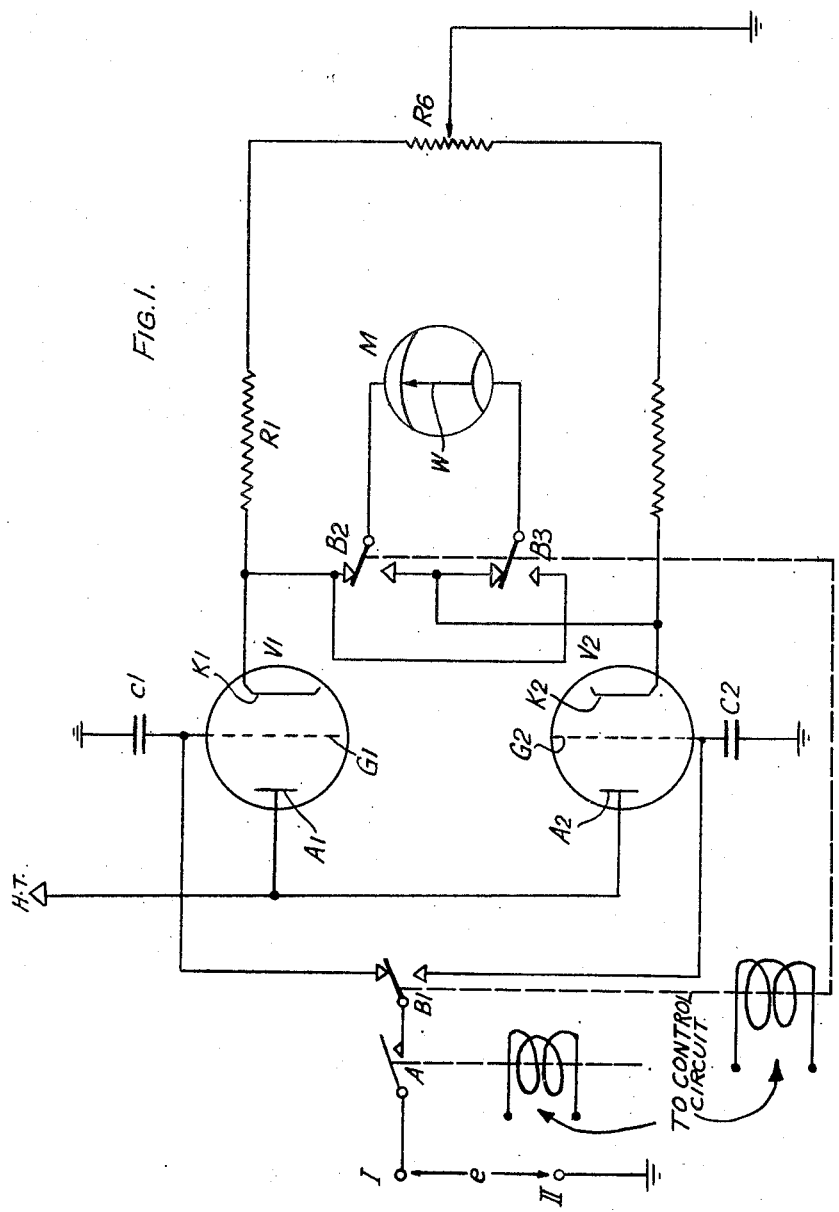

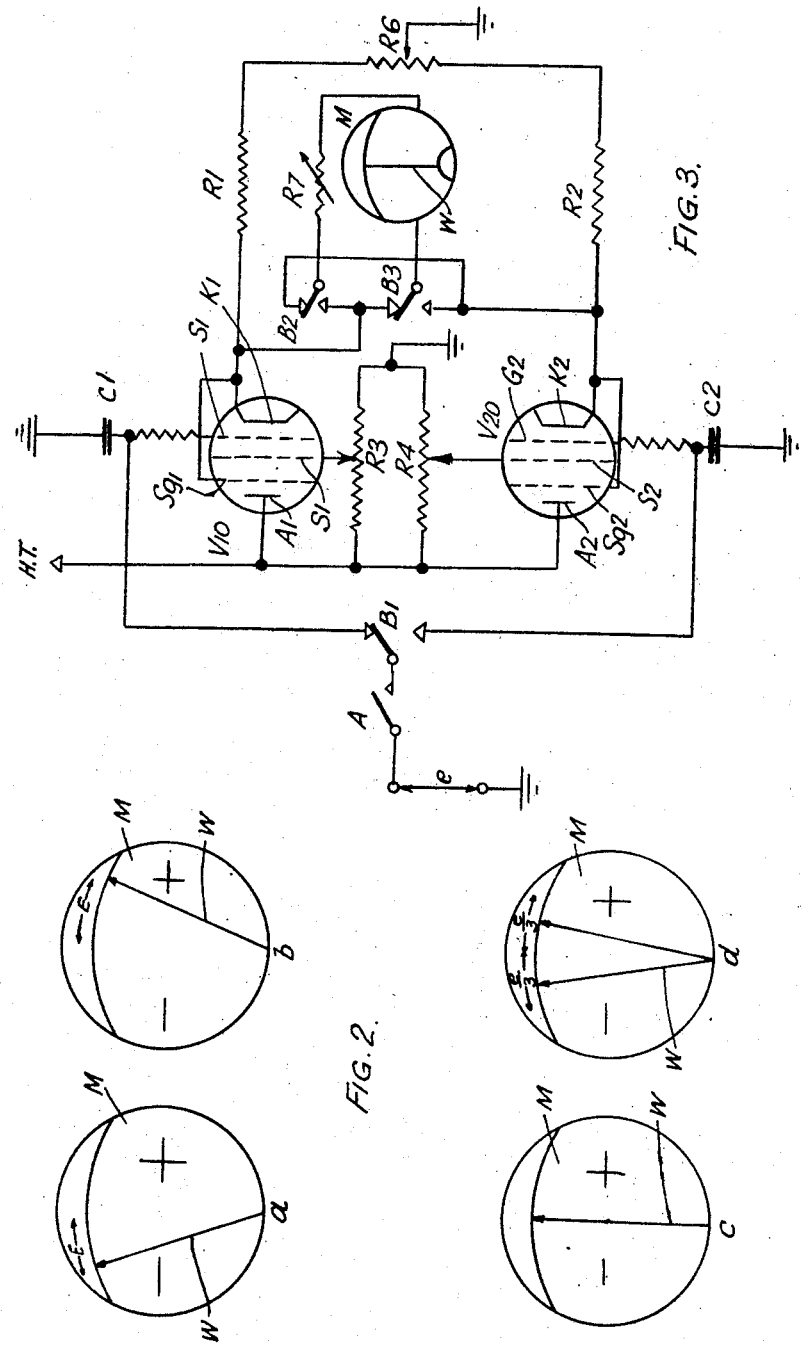

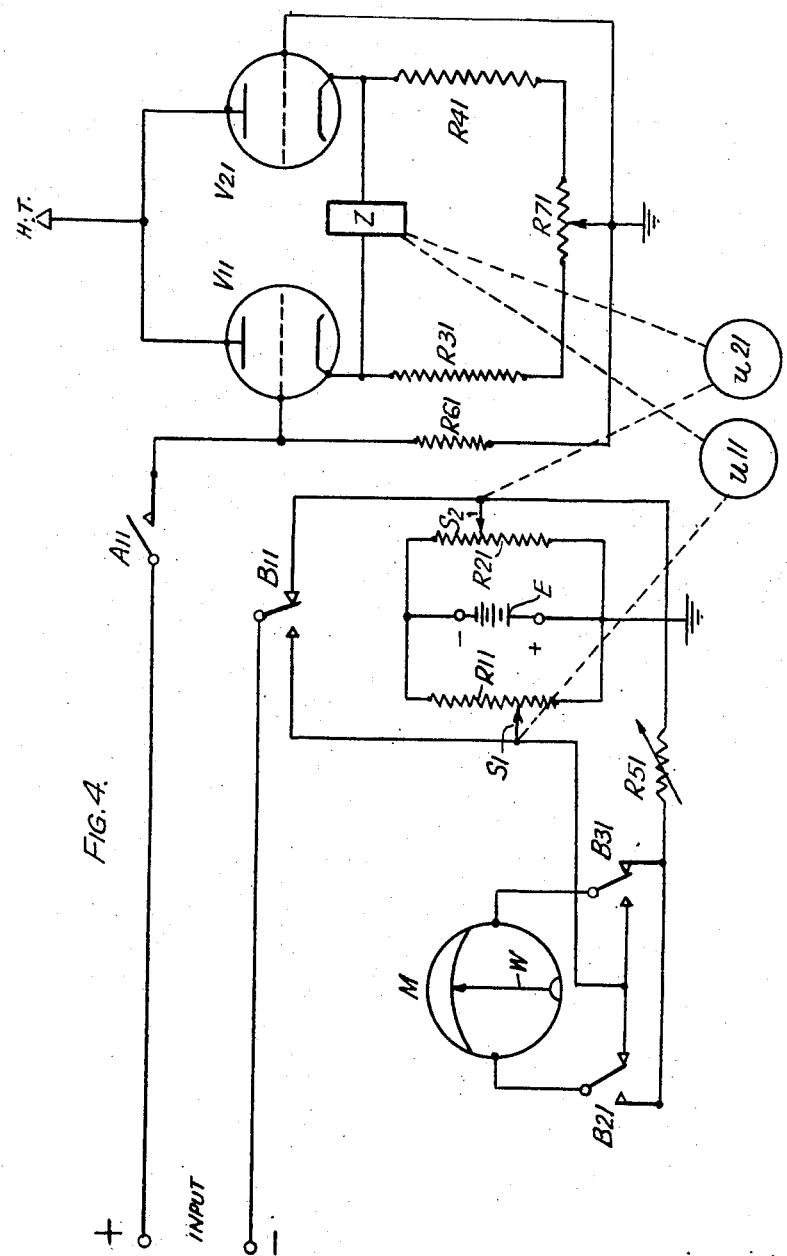

2,645,755

UNITED STATES PATENT OFFICE 2,645,755

ARRANGEMENT FOR INDICATING THE RATE OF CHANGE OF A PHYSICAL EFFECT

William Littery Garfield, London, England, assignor to International Standard Electric Corporation, New York, N. Y., a corporation of Delaware Application May 14, 1947, Serial No. 748,059
In Great Britain May 16, 1946

12 Claims. (Cl. 324—102)

The present invention relates to an arrangement for indicating the rate of change of a physical effect, and more particularly for indicating the rate of change of an electric D. C. potential.

The present invention is based on the idea of taking readings of the instantaneous values of an electric D. C. potential at pre-determined time intervals, comparing each reading with the preceding reading, and indicating the magnitude and direction of the change. If the rate of change of any other physical effect is to be indicated, such physical effect is first translated into a corresponding electric D. C. potential in any known manner, and subsequently the change of rate of the D. C. potential is indicated.

An arrangement according to this invention for indicating the rate of change of an electric D. C. potential comprises means for sensing the instantaneous values of the potential at predetermined time intervals, means for storing the instantaneous values for periods in excess of the said time intervals, and means for indicating the difference between the value stored at the beginning of each time interval and that stored at the beginning of the preceding time interval.

The storing means may comprise two capacitors and means for applying the electric potential under test alternately to one or the other of the said capacitors at the beginning of each time interval. Alternatively, the storing means may comprise a device for alternately altering one or the other of two voltages at the beginning of each time interval so as to correspond to the respective instantaneous value of the potential under test.

In the first case, the indicating means may comprise a valve-voltmeter which may include two valves, the capacitors being connected to the control electrodes, one to each, of the valves; two resistors, one in each anode circuit of the valves, and indicator connected to indicate the difference of voltage drop across the resistors; and means for reversing the connection of the indicator during each time interval. The resistors are preferably inserted in the cathode leads of the valves.

In the alternative case, the device for altering the two voltages may comprise two potentiometers across a source of voltage and means for alternately shifting one or the other of the sliders of said potentiometers to positions in which the voltage between the respective slider and a terminal of the respective potentiometer corresponds to the instantaneous value of the potential under test. In this case, the indicating means may comprise an indicator for indicating the potential difference between the said sliders, means being provided for reversing the connection of the indicator during each time interval. The shifting means may comprise two reversible electric motors, each for displacing the slider of one of the potentiometers, the said motors being controlled by a polarised relay arranged to be energised on sensing the potential under test if, and so long as, the voltage between the respective slider and the terminal of the respective potentiometer does not correspond to the said potential under test. The polarised relay may be energised by means of two valves, the potential under test and the voltage between the respective slider and the terminal of the respective potentiometer being applied in opposition to each other to the control electrode of one of the valves, whereby the polarised relay is operated in one or the other direction in dependence on the difference between the said potential under test and the said voltage, and the respective motor rotates in one or the other direction and displaces the respective slider accordingly in one or the other direction until the said voltage equals the potential under test.

To make the invention clearly understood, reference will now be made to the accompanying drawings, which are given by way of example only and in which:

Fig. 1 illustrates a first embodiment of the invention;

Fig. 2 illustrates a plurality of indicator readings;

Fig. 3 illustrates a modification of the arrangement of Fig. 1; and

Fig. 4 illustrates a second embodiment of the invention.

In all the figures, the same parts are indicated by the same reference characters.

Referring first to Fig. 1, two triodes V1 and V2 are provided, having cathodes K1 and K2, control electrodes G1 and G2, and anodes A1 and A2 respectively. The anodes A1 and A2 are connected together and to the positive terminal H. T. of a source of anode potential. The cathodes K1 and K2 are indirectly heated in any known manner, the heaters and heating circuits being omitted from the drawing. The control electrodes G1 and G2 are respectively connected to low-leakage capacitors C1 and C2, the free terminals of each capacitor being earthed. The control electrodes G1 and G2 are also connected to a change-over switch contact B1 so as to enable the control electrodes G1 and G2 and the capacitors C1 and C2 to be alternately connected to a switch contact A, which leads to an input terminal I, the potential under test being applied to the input terminal I and a second input terminal II which is earthed. The cathode K1 is connected to a load resistor R1 and the cathode K2 to a load resistor R2, the free ends of the resistors R1 and R2 being connected to a balancing resistor R6 having an adjustable tapping point connected to earth. An indicator M is connected to the cathodes K1 and K2 by means of change-over switch contacts B2 and B3, the indicator M having an indicator needle W which in its undeflected centre position indicates zero potential and which when deflected in one or the other direction indicates positive or negative potentials. The switch contacts A, B1, B2, and B3 are preferably relay contacts, the contacts B1, B2 and B3 being operated by one relay (not shown in Fig. 1) in timed relationship to another relay (not shown in Fig. 1) operating the switch contact A.

The arrangement described operates as follows:

Let us assume that, initially, the capacitors C1 and C2 are not charged; that the tapping point on the resistor R6 has been so adjusted that the needle W of the indicator M assumes its central, zero, position; that all the switch contacts are in the positions shown in Fig. 1; that the pre-determined time interval is one minute; and that a potential whose rate of change is to be determined is applied between the input terminals I and II. At a certain initial time, the contact A is momentarily closed and thereby the capacitor C1 is charged to a potential, say $+e$, which equals the instantaneous value of the potential under test. The control electrode G1 of the valve V1 assumes the potential $+e$, whereby a change in the anode current through the valve V1 and a corresponding change of the drop of potential across the resistor R1 are caused. A potential difference arises between the cathodes K1 and K2, which causes a deflection of the needle W of the indicator M, say to the left, as indicated in Fig. 2a, corresponding to negative potentials. However, immediately after the contact A has been opened again, the contacts B1, B2, and B3 change over. This causes the needle W of the indicator M to be deflected to the other side, i. e. to the right, as shown in Fig. 2b and to indicate a positive potential $+e$. This implies that the potental applied to the input terminals I and II of the arrangement has changed from zero to the value $+e$.

After one minute, i. e., at the beginning of the second time interval, the switch contact A is again momentarily closed and if, in the meantime, the potential applied to the input terminals I and II of the arrangement has not changed the capacitor C2 will now be charged to the potential $+e$. The control electrode G2 assumes the same potential, and the discharge current through the valve V2 is changed in the same manner as the discharge current through the valve V1 was previously changed, causing a corresponding drop of potential across the resistor R2, so that now the potential difference between the cathodes K1 and K2 is zero. Consequently, the needle W of the indicator M returns to its zero position as shown in Fig. 2c. When the switch contact A has been opened again, the switch contacts B1, B2, and B3 change over. This, however, has no effect on the reading of the indicator M, which correctly indicates a zero change of potential during the preceding time interval.

Let us now assume that at the end of the second minute, i. e., at the beginning of the third time interval, the potential applied to the input terminals I and II of the arrangement has dropped to the value $+\tfrac{2}{3}e$. When the switch contact A closes, the potential on the capacitor C1 is reduced to $+\tfrac{2}{3}e$ while the capacitor C2 remains charged to the preceding potential $+e$. The potential difference between the cathodes K1 and K2 therefore corresponds to the value $-\tfrac{1}{3}e$ (i. e., $\tfrac{2}{3}e-e$), causing the needle W of the indicator M to be deflected towards the right to a position corresponding to $+\tfrac{1}{3}e$, as indicated in Fig. 2d by the dashed line. When the switch contact A has been opened again, the switch contacts B1, B2, and B3 change over so that the potential difference applied to the indicator M is reversed and the needle W of the indicator M assumes the position shown in Fig. 2 by the full line, which corresponds to the potential $-\tfrac{1}{3}e$, indicating correctly that the potential applied to the input terminal I and II of the arrangement has decreased by $\tfrac{1}{3}e$.

Let us assume that at the end of the third minute, i. e., at the beginning of the fourth time interval, the potential applied to the input terminals of the arrangement is reduced by the same amount, that is to say, $+\tfrac{1}{3}e$. When the switch contact A closes, the capacitor C2 will be charged to the potential $+\tfrac{1}{3}e$, which brings the needle W of the indicator M again into the position indicated by the dashed line in Fig. 2d, the difference between the cathodes V2 and V1 being $\tfrac{1}{3}e-\tfrac{2}{3}e=-\tfrac{1}{3}e$. After the switch contact A has been opened, the switch contacts B1, B2, and B3 are again reversed and the needle W assumes the position $-\tfrac{1}{3}e$, indicated by the full line in Fig. 2d, that is to say, the indicator M correctly indicates the potential $-\tfrac{1}{3}e$ corresponding to the decrease of the potential applied to the input terminals I and II of the arrangement.

It will easily be verified that at the beginning of each time interval, on closing the contact switch A, the indicator M indicates the change of potential during the preceding time interval momentarily with the wrong sign, which however is corrected as soon as the switch contact A is opened and the switch contacts B1, B2, and B3 have changed over. When the switch contacts B1, B2 and B3 have been operated, the rate of change of the potential across the input terminals I and II of the arrangement is indicated with the correct sign. It will also be seen that the potential of one of the cathodes K1, K2, corresponds to the potential under test at the beginning of the time interval at which the reading is taken while the potential of the other cathode corresponds to the potential under test at the beginning of the preceding time interval. Thus, the indication of the indicator M corresponds to the difference between these cathode potentials, i. e., to the rate of change of the potential under test during the preceding time interval.

Modifications of the arrangement described are possible. For example, as shown in Fig. 3, the valves used may be pentodes V10 and V20, the suppressor grids Sg1 and Sg2 of which are directly connected to the cathodes K1 and K2 respectively. The screen grids S1 and S2 are biased by means of resistors R3 and R4, the tapping points of which are adjustable for balancing the mutual conductances of the pentodes. The capacitors C1 and C2 are connected in series with resistors R5 and R8 respectively in order to reduce leakage. A variable resistor R7 serves to set the sensitivity of the indicator M. Otherwise the arrangement is similar to that of Fig. 1 and is believed to need no further explanation.

In the second embodiment of the invention illustrated in Fig. 4, two triodes V11 and V21 are provided, the anodes of which are connected together and to the positive terminal H. T. of a source of anode potential. The control electrode of the triode V21 is earthed and that of the triode V11 is connected to earth across a resistor R61. The positive input terminal and the control grid of the grid of the triode V11 are connected to a switch contact A11, which is normally open. The cathode of the triode V11 is connected to a resistor R31 and that of the triode V21 to a resistor R41, the free ends of the resistors R31 and R41 being connected to a resistor R71 having an adjustable tapping point connected to earth. A polarised relay Z is connected to the cathodes of the triodes V11 and V21. A D. C. voltage source E, the positive terminal of which is earthed, is shunted by two potentiometers R11 and R21. Each of the potentiometers R11 and R21 is provided with a slider S1 and S2 respectively, which may alternately be connected to the negative input terminal by means of change-over switch contacts B11. An indicator M, having an indicating needle W, is connected by means of change-over switch contacts B21 and B31 to the slider S1 and to one terminal of a variable resistor R51, the other terminal of which is connected to the slider S2. The slider S1 is adapted to be shifted along the potentiometer R11 by means of an electro-motor U11 and the slider S2 along the potentiometer R21 by means of an electro-motor U21, the motors being arranged to rotate alternately when the polarised relay Z is operated, as indicated by dashed lines, the direction of rotation being dependent on the sense in which the polarised relay Z is excited.

The arrangement operates as follows:

The D. C. potential under test is applied to the input terminals. By means of the switch contact B11, the sliders S1 and S2 are alternately connected to the negative input terminal. When the switch contact B11 has the position illustrated in Fig. 4 and the switch contact A11 is closed, the positive input terminal is connected to the control electrode of the triode V11 and the voltage tapped off by the slider S2 from the potentiometer R21 lies in series with, but opposes, the potential under test. If the slider S2 taps off from the potentiometer R21 a voltage equalling the potential under test, the control voltage on the control electrode of the triode V11 is zero. The tapping point of the resistor R71 is so adjusted that, in this case, the polarised relay Z is not operated. If, on the other hand, the voltage tapped off by the slider S2 is not equal to the potential under test, then the polarised relay Z is operated and causes the motor U21 to rotate in one or the other direction depending on the sense in which the polarised relay Z is excited. Thereby, the slider S2 is displaced along the potentiometer R21 until the voltage tapped off by the slider S2 equals the potential across the input terminals of the arrangement, whereupon the polarised relay Z is de-energised and the motor U21 stops rotating. The switch contact A11 is subsequently opened and the switch contacts B11, B21, and B31 change over. At a pre-determined time interval, the switch contact A11 is again closed and if now the potential under test and the voltage tapped off by the slider S1 from the potentiometer R11 are not equal to each other, the polarised relay Z is operated and causes the motor U11 to rotate and to displace the slider S1 along the potentiometer R11 in the appropriate direction until the voltage tapped off by the slider S1 equals the value of the potential under test. The switch contact A11 is opened and the switch contacts B11, B21, and B31 again change over.

It will easily be seen that each time the switch contacts B11, B21, and B31 have switched over, the needle W of the indicator M indicates the voltage difference existing between the two sliders with the correct sign owing to the reversal of its connection by the switch contacts B21 and B31, that is to say, it correctly indicates the change of the potential under test during the preceding time interval. It will also be appreciated that the potential across the input terminals at the beginning of each time interval corresponds to the voltage tapped off by one of the two sliders after it has come to rest. The voltage tapped off will be stored so that it may be compared by means of the indicator with the voltage similarly tapped off by the other slider at the beginning of the next time interval.

Modifications of the arrangements described are possible. For example, the indicator may be short-circuited during the time between closing the switch contacts A or A11 and the subsequent operation of the switch contacts B1, B2, and B3, or B11, B21, and B31 respectively so as to prevent momentary deflection of the needle W of the indicator M in the wrong direction. Again, the indicator shown in Figs. 1 and 3 need not be connected direct to the cathodes but may be connected to suitably chosen tapping points on the resistors R1 and R2. The resistors R1 and R2 may, if desired, be inserted in the anode leads of the valves instead of in the cathode leads as shown.

The arrangement may be used for indicating the rate of change of other physical effects which can be translated in any known manner into corresponding D. C. potentials. For example, the rate of change of frequency of an electric alternating current may be indicated. Likewise, the rate of change of an electric current, intensity of electric power, of temperature, of light intensity, of pressure, of mechanical positions, of chemical effects such as pH values, of resistance values, may be indicated. In all such cases, the indicator may be suitably calibrated so as to enable the rate of change to be read off in appropriate units.

What is claimed is:

1. In a system for indicating the rate of change of a direct current potential having means for successively sensing the instantaneous values of the potential at predetermined time intervals, means for separately storing the instantaneous values of potential for periods in excess of said time intervals and means for indicating the difference of said values, an arrangement for indicating the difference of said values at the beginning of each time interval comprising a first switch means for alternately applying the successively sensed instantaneous values to respective of said storing means, second switch means for alternately coupling said means for indicating to both said storing means in opposite phase, and means for simultaneously operating said first and second switch means during each time interval.

2. An arrangement as claimed in claim 1, wherein storing means comprise two capacitors.

3. An arrangement as claimed in claim 2, wherein the indicating means comprise a valve voltmeter.

4. An arrangement as claimed in claim 3, wherein the valve voltmeter comprises two valves, the capacitors being connected to the control electrodes, one to each, of the valves; two resistors, one in each cathode circuit of the valves; an indicator connected to indicate the difference of voltage drop across the resistors.

5. An arrangement as claimed in claim 4, wherein the terminals of the resistors remote from the cathodes are connected to an auxiliary resistor having an adjustable tapping point leading to the negative terminal of a source of anode voltage, thereby to enable balancing of the arrangement by shifting the said tapping point along the said auxiliary resistor.

6. An arrangement as claimed in claim 1, wherein the storing means comprise a device for alternately altering the two voltages at the beginning of each time interval so as to correspond to the respective instantaneous value of the potential under test.

7. An arrangement as claimed in claim 6, wherein the device for altering the two voltages comprises two potentiometers across a source of voltage and means for alternately shifting one or the other of the sliders of said potentiometers to positions in which the voltage between the respective slider and a terminal of the respective potentiometer corresponds to the instantaneous value of the potential under test.

8. An arrangement as claimed in claim 7, wherein the indicating means comprise an indicator for indicating the potential difference between the said sliders, means being provided for reversing the connection of the indicator during each time interval.

9. An arrangement as claimed in claim 8 wherein the shifting means comprise two reversible electro-motors each for displacing the slider of one of the potentiometers, the said motors being controlled by a polarised relay arranged to be energized on sensing the potential under test, if, and so long as, the voltage between the respective slider and the terminal of the respective potentiometer does not correspond to the said potential under test.

10. An arrangement as claimed in claim 9, wherein the polarised relay is energised by means of two valves, the potential under test and the voltage between the respective slider and the terminal of the respective potentiometer being applied in opposition to each other to the control electrode of one of the valves whereby the polarised relay is operated in one or the other direction in dependence on the difference between the said potential under test and the said voltage, and the respective motor rotates in one or the other direction and displaces the respective slider accordingly in one or the other direction until the said voltage equals the potential under test.

11. An arrangement for indicating a rate of change of direct current potential comprising means for alternately sensing the instantaneous values of the potential at predetermined time intervals, means comprising two capacitors for separately storing the instantaneous values as an electrostatic charge for periods in excess of the said time intervals, means for applying the direct current potential under test alternately to one or the other of the said capacitors at the beginning of each time interval, a valve volt meter comprising two pentode valves, means connecting each of said capacitors to the control electrodes, one to each of said valves, and two resistors, one to each cathode circuit of the valve, an indicator connected to indicate the difference of voltage drop across the resistors, and means for reversing the connection of the indicator during each time interval simultaneously with the alternate application of said changes to said capacitors.

12. The device of claim 11 wherein a resistor is provided in the control electrode circuit of each valve for reduction of leakage of the control electrode circuits.

WILLIAM LITTERY GARFIELD.

References Cited in the file of this patent

UNITED STATES PATENTS

| Number | Name | Date |
|---|---|---|
| 2,356,567 | Cockrell | Aug. 22, 1944 |
| 2,363,336 | Keeler | Nov. 21, 1944 |
| 2,419,607 | Terry et al. | Apr. 29, 1947 |